US00RE39845E

(19) United States
(12) Reissued Patent
Hasfjord et al.

(10) Patent Number: US RE39,845 E
(45) Date of Reissued Patent: Sep. 18, 2007

(54) MAINTENANCE ALERT SYSTEM FOR HEAVY-DUTY TRUCKS

(75) Inventors: David Lawrence Hasfjord, Dearborn, MI (US); Richard M. Avery, Jr., West Bloomfield, MI (US); Dennis Michael Letang, Canton, MI (US); James A. Gray, Canton, MI (US); Donald M. McDonald, Howell, MI (US); Marleen F. Thompson, Sterling Heights, MI (US); Ian Daniel McKenzie, Canton, MI (US); John Edward Longnecker, Livonia, MI (US)

(73) Assignee: Detroit Diesel Corporation, Detroit, MI (US)

(21) Appl. No.: 10/167,028

(22) Filed: Jun. 10, 2002

Related U.S. Patent Documents

Reissue of:
(64) Patent No.: 6,172,602
Issued: Jan. 9, 2001
Appl. No.: 09/273,865
Filed: Mar. 22, 1999

(51) Int. Cl.
*B60Q 1/00* (2006.01)

(52) U.S. Cl. ..... 340/438; 340/439; 340/450; 340/450.2; 340/450.3; 340/451; 340/457.4; 701/29; 701/30; 701/34

(58) Field of Classification Search ..... 340/438, 340/439, 450, 450.2, 450.3, 451, 457.4, 457, 340/461, 462; 701/29, 30, 34
See application file for complete search history.

(56) References Cited

U.S. PATENT DOCUMENTS 3,611,337 A * 10/1971 Balzer et al. ..... 340/607
4,034,335 A * 7/1977 Harazoe et al. ..... 123/397
4,136,329 A * 1/1979 Trobert ..... 340/459
4,223,654 A * 9/1980 Wessel et al. ..... 123/358
4,497,057 A * 1/1985 Kato et al. ..... 714/46
4,626,344 A * 12/1986 Fick et al. ..... 210/90
4,685,066 A 8/1987 Hafele et al.
4,768,377 A * 9/1988 Habelmann et al. ..... 73/313
4,787,039 A * 11/1988 Murata ..... 701/1
4,845,469 A * 7/1989 Benda ..... 340/450.3
4,876,529 A 10/1989 Kubota et al.
4,926,331 A 5/1990 Windle et al.
4,932,244 A * 6/1990 Yamaguchi et al. ..... 73/117.3
4,933,852 A * 6/1990 Lemelson ..... 701/30
4,943,797 A 7/1990 Steffenhagen
5,006,829 A 4/1991 Miyamoto et al.
5,020,362 A * 6/1991 Hart et al. ..... 73/119 A
5,046,583 A 9/1991 Sasaki et al.
5,131,371 A * 7/1992 Wahl et al. ..... 123/436
5,165,373 A * 11/1992 Cheng ..... 123/300
5,165,579 A * 11/1992 Lund ..... 222/192
5,196,824 A * 3/1993 Helm ..... 340/450.3
5,205,261 A * 4/1993 Betts et al. ..... 123/494
5,210,769 A * 5/1993 Seidel et al. ..... 73/295

(Continued)

FOREIGN PATENT DOCUMENTS

EP 0 268 684 A1 6/1998
GB 2 288 892 A 11/1995

OTHER PUBLICATIONS

Surface Vehicle Recommended Practice, SAE J1587, Rev. Jul. 1998, pp. 1–196.

*Primary Examiner*—Benjamin C. Lee
(74) *Attorney, Agent, or Firm*—Brooks Kushman P.C.

(57) ABSTRACT

A real-time maintenance alert system and method for use in a heavy-duty truck having an engine controller with memory are provided. The system includes a sensor operative to indicate an engine condition from the group consisting of: oil filter restriction, air filter restriction, fuel filter restriction, oil level, and coolant reserve tank fluid level. Control logic at the engine controller processes the sensor signal to determine a real-time fault condition, when appropriate.

20 Claims, 3 Drawing Sheets

Amended

U.S. PATENT DOCUMENTS 5,231,962 A * 8/1993 Osuka et al. ..... 123/299
5,282,386 A * 2/1994 Niemczyk et al. ..... 73/292
5,298,881 A * 3/1994 Bowman ..... 340/450.3
5,313,924 A * 5/1994 Regueiro ..... 123/456
5,357,926 A * 10/1994 Hu ..... 123/321
5,402,760 A * 4/1995 Takeuchi et al. ..... 123/300
5,445,128 A * 8/1995 Letang et al. ..... 123/436
5,477,731 A * 12/1995 Mouton ..... 73/38
5,477,827 A * 12/1995 Weisman et al. ..... 123/436
5,483,927 A * 1/1996 Letang et al. ..... 123/41.12
5,494,219 A * 2/1996 Maley et al. ..... 239/88
5,604,306 A * 2/1997 Schricker ..... 73/118.2
5,647,317 A * 7/1997 Weisman et al. ..... 123/299
5,687,687 A 11/1997 Trueblood et al.
5,732,676 A * 3/1998 Weisman et al. ..... 123/436
5,736,940 A * 4/1998 Burgener ..... 340/994
5,771,865 A * 6/1998 Ishida ..... 123/467
5,783,993 A * 7/1998 Briski et al. ..... 340/525
5,857,159 A * 1/1999 Dickrell et al. ..... 701/35
5,896,083 A * 4/1999 Weisman et al. ..... 340/438
6,009,355 A * 12/1999 Obradovich et al. ..... 701/1
6,097,306 A * 8/2000 Leon et al. ..... 340/5.1
6,166,631 A 12/2000 Kennedy et al.

* cited by examiner

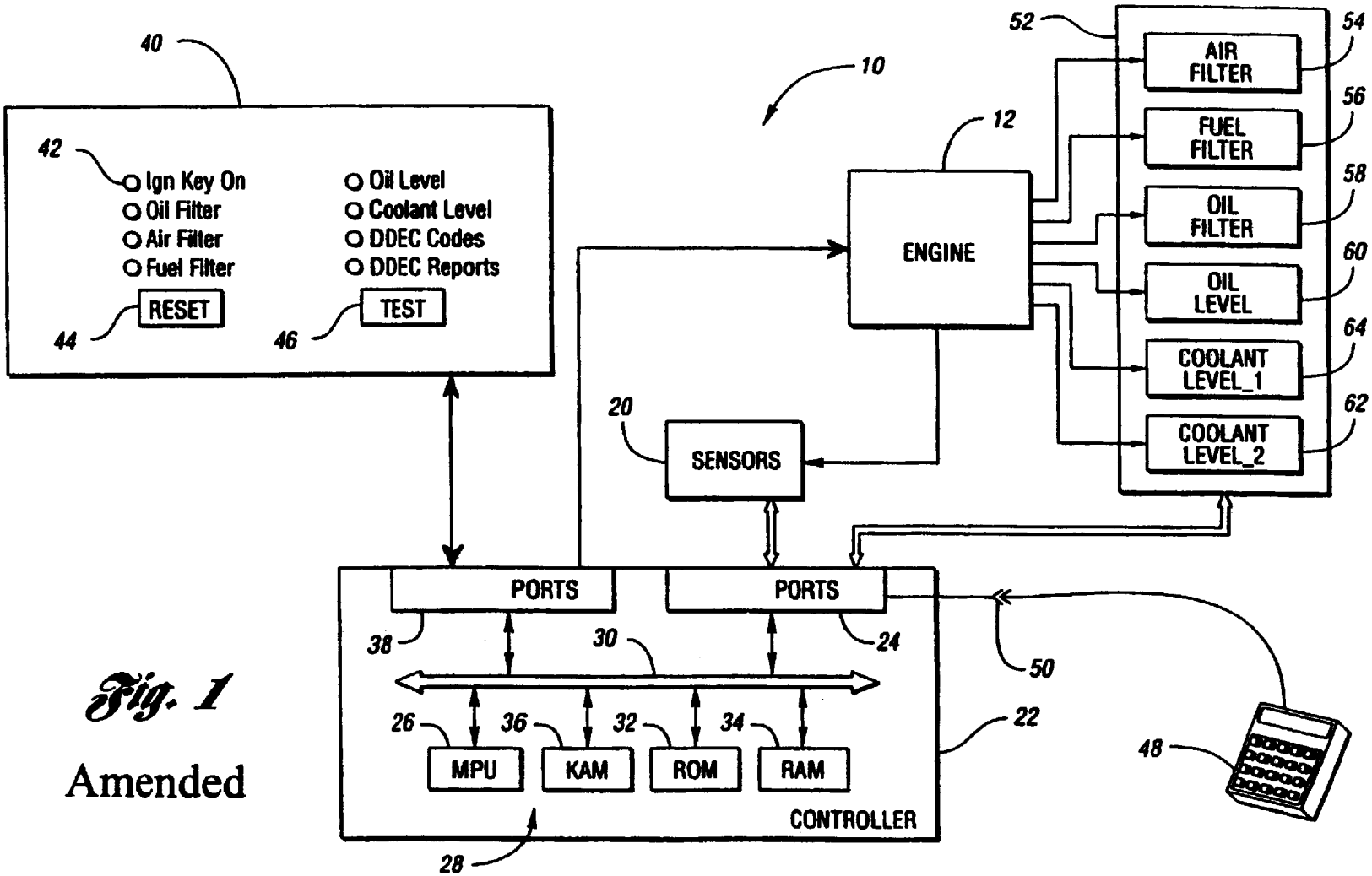
Fig. 1
Amended

MAINTENANCE ALERT SYSTEM FOR HEAVY-DUTY TRUCKS

Matter enclosed in heavy brackets [ ] appears in the original patent but forms no part of this reissue specification; matter printed in italics indicates the additions made by reissue.

TECHNICAL FIELD

The present invention relates to a real-time maintenance alert system for use in a heavy-duty truck having an engine controller with memory.

BACKGROUND ART

In the control of fuel injection systems, electronic control units having volatile and non-volatile memory, input and output driver circuitry, and a processor capable of executing a stored instruction set are utilized to control various functions of the engine and its associated systems. A particular electronic control unit communicates with numerous sensors, actuators, and other electronic control units necessary to control various functions, which may include various aspects of fuel delivery, transmission control, or many others.

In heavy-duty truck applications, in addition to utilizing a highly complex engine controller that monitors the engine conditions so that when required, engine protection and engine shutdown logic may be executed to prevent possible engine damage, some normal service items of a truck must be physically inspected by opening the hood to physically check each item, preferably each time the truck is stopped. With the heavy-duty trucking industry becoming more and more competitive, maintenance reduction is becoming significantly more important. As such, it is sometimes undesirably time consuming to tilt the hood and physically check each normal service item of each truck throughout the day at a trucking bay.

For the foregoing reasons, there is a need for a system that facilitates the checking of normal service items of a truck.

DISCLOSURE OF INVENTION

It is therefore an object of the present invention to provide a real-time maintenance alert system for use in a heavy-duty truck that allows normal service items of a truck to be checked at a glance, rather than opening the hood to physically check each item.

In carrying out the above object and other objects and features of the present invention, a real-time maintenance alert system for use in a heavy-duty truck having an engine and engine controller with memory is provided. The system comprises a sensor operative to produce a signal indicative of a least one engine condition from the group consisting: an oil filter restriction condition, a fuel filter restriction condition, an air filter restriction condition, an oil level, and a coolant level in a coolant reserve tank. The system further comprises control logic at the engine controller. The control logic is configured to process the sensor signal and to determine a real-time fault condition when the engine condition falls outside of a predetermined acceptable range. The control logic is further operative to produce an output signal in response to the real-time fault condition.

In a preferred embodiment, a display device receives the control logic output signal; and, the display device has an indicator operative to alert a user of the real-time fault condition.

Further, in carrying out the present invention, a real-time maintenance alert method for use in a heavy-duty truck having an engine and an engine controller with memory is provided. The method comprises generating a signal with an engine sensor, and processing the signal with control logic at the engine controller. The signal indicates at least one engine condition from the group consisting of: an oil filter restriction condition, a fuel filter restriction condition, an air filter restriction condition, an oil level, and a coolant level at a coolant reserve tank. The signal is processed to determine a real-time fault condition when the engine condition falls outside of a predetermined acceptable range. The control logic is further operative to produce an output signal in response to the real-time fault condition. Preferably, the method further comprises generating an alert signal on a display device to alert a user of the real-time fault condition when such condition is present.

Still further, in carrying out the present invention, a display device for use with a real-time maintenance alert system for a heavy-duty truck having and an engine controller with memory is provided. The display device comprises a housing, an interface, and an indicator device. The interface is configured to communicate with control logic at the engine controller. The control logic is configured to process a sensor signal indicative of an engine condition from the group consisting: an oil filter restriction condition, a fuel filter restriction condition, an air-filter restriction condition, an oil level, and a coolant level in a coolant reserve tank. The control logic is further configured to determine a real-time fault condition when the engine condition falls outside of a predetermined acceptable range. The control logic is further operative to produce an output signal in response to the real-time fault condition. The interface receives the output signal.

The indicator device is affixed to the housing and communicates with the interface. The indicator device produces a visual indication when the output signal corresponding to the real-time fault condition is received at the interface.

The advantages associated with the embodiments of the present invention are numerous. For example, embodiments of the present invention allow normal service items of a truck to be checked at a glance rather than requiring opening of the hood to physically check each item. Further, preferably, control logic for the real-time maintenance alert system operates independently of any existing engine protection or engine shutdown control logic. That is, the maintenance alert system control logic provides an indication when normal service items require maintenance. It is to be appreciated that the maintenance alert system embodiments of the present invention alert a user of a real-time fault condition, based on a sensor measurement, as opposed to based on the passage of time or distance as measured by the odometer since a previous maintenance operation.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic diagram of a fuel injection system made in accordance with the present invention;

BEST MODE FOR CARRYING OUT THE INVENTION

Figure 2:
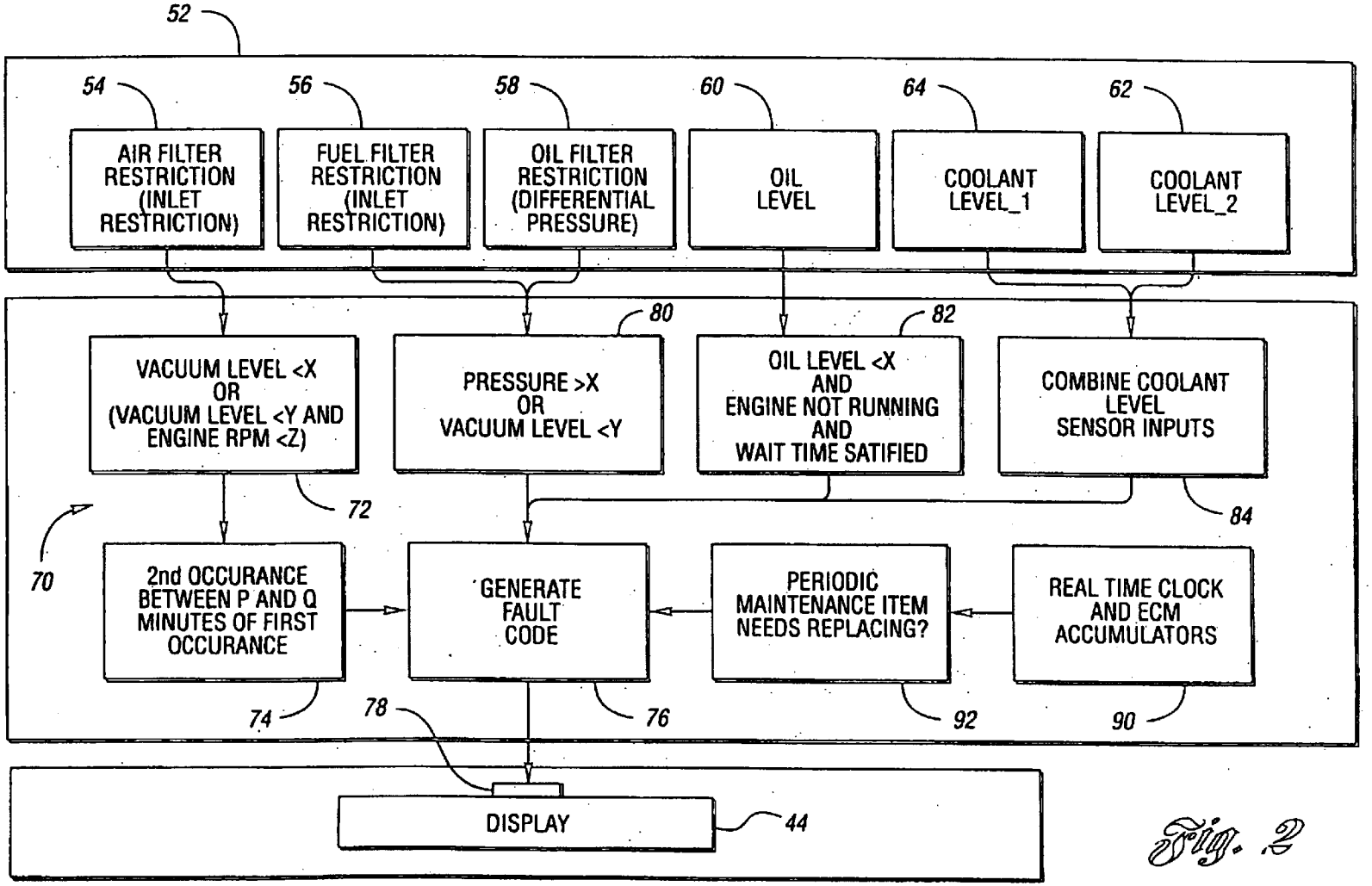
FIG. 2 is a functional block diagram illustrating a real-time maintenance alert system for a heavy-duty truck and associated methods used by the system.

Referring to FIG. 1, a system for controlling a heavy duty truck is shown. The system, generally indicated by reference numeral 10, includes an engine 12 having a plurality of cylinders, fed by fuel injectors. In a preferred embodiment, engine 12 is a compression-ignition internal combustion engine, such as a four, six, eight, twelve, sixteen or twenty-four cylinder diesel engine, or a diesel engine having any other desired number of cylinders. The fuel injectors are receiving pressurized fuel from a supply connected to one or more high or low pressure pumps (not shown) as is well known in the art. Alternatively, embodiments of the present invention may employ a plurality of unit pumps (not shown), with each pump supplying fuel to one of the injectors.

The system 10 may also include various sensors 20 for generating signals indicative of corresponding operational conditions or parameters of engine 12, the vehicle transmission (not shown), and other vehicular components. Sensors 20 are in electrical communication with a controller 22 via [input] ports 24. Controller 22 preferably includes a microprocessor 26 in communication with various computer readable storage media 28 via data and control bus 30. Computer readable storage media 28 may include any of a number of known devices which function as a read-only memory (ROM) 32, random access memory (RAM) 34, keep-alive memory (KAM) 36, and the like. The computer readable storage media may be implemented by any of a number of known physical devices capable of storing data representing instructions executable via a computer such as controller 22. Known devices may include, but are not limited to, PROM, EPROM, EEPROM, flash memory, and the like in addition to magnetic, optical, and combination media capable of temporary or permanent data storage.

Computer readable storage media 28 include various program instructions, software, and control logic to effect control of various systems and subsystems of the vehicle, such as engine 12, the vehicle transmission, and the like. Controller 22 receives signals from sensors 20 via [input] ports 24 and generates output signals which may be provided to various actuators and/or components via [output] ports 38. Signals may also be provided to a display device 40 which includes various indicators such as lights 42 to communicate information relative to maintenance alert system operation. Further, display device 40 may be provided with a reset switch 44 and a test switch 46.

A data, diagnostics, and programming interface 48 may also be selectively connected to controller 22 via a plug 50 to exchange various information therebetween. Interface 48 may be used to change values within the computer readable storage media 28, such as configuration settings and control logic.

In accordance with the present invention, in addition to sensors 20 which are tied to engine control features, engine protection features, and shutdown logic, engine 12 communicates with a plurality of additional sensors 52. In particular, indicators 42 on display device 40, in accordance with the present invention, display information obtained from additional sensors 52 whose outputs are processed at engine controller 22. In accordance with the present invention, additional sensors 52 include at least one of the following sensor: air filter restriction sensor 54, fuel filter restriction sensor 56, oil filter restriction sensor 58, oil level sensor 60, and coolant level_2 sensor 62. Coolant level_1 sensor 64 is tied to engine protection control logic and sensors 20, but is shown near coolant level_2 sensor 62 to show the interrelation of the two sensors as will be described along with further description of the sensors in sensor group 52 in accordance with the present invention. Of course, it is to be appreciated that in accordance with the present invention, maintenance alert system control logic which utilizes outputs from sensor group 52 operates independently of normal control logic for engine control, engine protection and engine shutdown control.

In operation of normal engine logic (not including control logic associated with sensors 54, 56, 58, 60, and 62, controller 22 receives signals from sensors 20 and 64 and executes control logic embedded in hardware and/or software to control engine 12. In a preferred embodiment, controller 22 is the DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety.

As will be appreciated by one of ordinary skill in the art, the control logic may be implemented or effected in hardware, software, or a combination of hardware and software. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

With reference to FIG. 2, the operation of a maintenance alert system in accordance with the present invention is illustrated, along with control logic 70 within engine controller 22 that processes outputs from sensor group 52 to provide input signals for display device 40. Air filter restriction sensor 54, preferably, is mounted on the air intake tube after the air cleaner or on the air cleaner and monitors air inlet depression. Sensor 54 is designed to trigger at one of two set points based on air inlet depression and generate a fault code. The fault code indicates that the air filter is plugged and needs to be replaced. That is, a very large pressure drop across the air filter as determined by measuring air inlet depression, may be used as a reliable indicator of a clogged air filter that needs replacement. Additional control logic is preferably built into the engine controller to help prevent false air filter restriction codes due to wet filters or clogged air intakes due to snow and ice build-up.

Control logic at engine controller 22 is configured as follows. The control logic processes the signal from air filter restriction sensor 54 to determine an air filter restriction real-time fault condition when the air inlet depression falls below a threshold, as indicated at block 72 with the expression: vacuum level is less than X. In a preferred embodiment, as shown at block 72, the threshold is a function of engine rpm and particularly, the threshold is a first value (Y) when the engine rpm is less than a predetermined value (Z) and otherwise the threshold is the second value, X.

Further, in a preferred embodiment, the air filter restriction real-time fault condition is determined in response to the air inlet depression falling below the threshold more than one time during a predetermined time interval. As indicated at control logic block 74, it is preferred that a real-time fault condition only be logged when a second occurrence of a sensor output indicating an air filter restriction occurs between P and Q engine hours after a first occurrence thereof. Still further, it is preferred that at control logic block 72, the sensor output is filtered such that vacuum level or inlet depression must fall below the threshold for a significant amount of time (preferably predetermined), before one of the "less than" conditions can be satisfied. That is, for vacuum level to be considered less than the threshold by control logic block 74, vacuum level must fall below the threshold for a predetermined significant amount of time. This implementation is preferred to prevent accidental and unnecessary fault logging.

Fuel filter restriction sensor 56 is positioned and configured to monitor fuel inlet restriction and is preferably configured to measure depression after the filter. Oil filter restriction sensor 58 is configured and positioned to measure differential pressure across the oil filter. Oil filter restriction sensor 58, preferably, is mounted in a special adaptor that is located between the engine oil filter housing and the front oil filter. The sensor measures the pressure differential between the oil filter inlet and outlet. Once this pressure exceeds a preset value or predetermined threshold, the oil filter is deemed to be too restrictive and the appropriate fault code is generated. There is special logic built into the system to compensate for cold oil and to provide back up warning in the event that the sensor fails. As shown at control logic block 80, a real-time fault may be determined by the maintenance alert system in the event that the differential pressure exceeds a threshold, X, or in the event that the vacuum level (due to a fuel filter inlet restriction) falls below a threshold, Y. Further, similar to air filter restriction sensor 54, sensors 56 and 58 preferably have outputs that are filtered by the control logic such that a predetermined significant amount of time must pass with differential pressure greater than X or vacuum level less than Y prior to a fault being logged in the system.

Oil level sensor 60, preferably, is mounted in the engine oil pan and will indicate low oil around the "add" mark on the dip stick, which is sometimes in a heavy-duty engine, the four quart low mark. In such an embodiment, the oil level can only be checked with the engine off (zero engine rpm). Further, in such an embodiment, there is also a wait time associated with the oil level sensor because it will take several minutes for the oil to drain back to the sump after the engine is stopped. After this wait time, if the oil level sensor determines that the oil level is low, a fault code is generated. As shown by control logic block 82, in a preferred embodiment, a fault condition is determined when the oil level falls below a threshold, X, and the engine is not running, and the engine has not been running for a predetermined amount of time or wait time.

Coolant level_2, or maintenance fault coolant level sensor 62, preferably, is mounted in the surge tank and is designed to indicate low coolant around the three quart low point, or three quarts below the top of the tank. This will give notice to the operator/mechanic that the coolant level is lower than normal before the primary coolant level sensor (coolant level_1 or shutdown coolant level sensor 64) triggers an engine shutdown (if programmed for shutdown). Preferably, the fault coolant level sensor 62 is configured such that when the sensor is "dry," the appropriate fault code is generated. Further, a special module may be required to process the electronic signal from the sensor prior to processing by controller 22.

As shown, engine controller 22, as mentioned previously, operates shutdown logic that may be triggered based on the output of shutdown coolant level sensor 64, in addition to fault coolant level sensor 62 of the present invention providing a signal to engine controller 22 for maintenance system operation. The outputs of the two sensors are shown together entering control block 84, but it is to be understood and is appreciated by one of ordinary skill in the art that in accordance with the present invention, the outputs of sensors 54, 56, 58, 60, and 62 (FIG. 1) are processed by control logic within controller 22 that is separate from any engine protection or engine shutdown control logic, and is provided specifically to allow an operator/mechanic to readily see the condition of various engine items without being required to open the trunk hood.

With continuing reference to FIG. 2, after outputs 52 are processed by various logic blocks 72, 74, 80, 82, 84 within engine controller 22, fault codes are generated by control logic block 76 when necessary and are sent to display device 44 by a connection interface 78. As described above, in addition to the control logic of the present invention that implements a maintenance alert system, additional maintenance control logic that is not real-time based is preferably also implemented. Of course, it is to be appreciated that the real-time based maintenance alert system of the present invention is advantageous in that normal maintenance items are monitored in real-time to allow a mechanic/operator to check engine item integrity without being required to tilt the hood. An example of a non-real-time maintenance control logic that may optionally be implemented is indicated at a control logic block 90 and control logic block 92. Control logic block 90 is a real-time clock and a set of engine control module accumulators. Control block 92 determines that maintenance is required when a predetermined amount of time or amount of distance on the odometer has passed since a last maintenance event. For example, an "oil change needed" alert may be produced after a set amount of mileage has passed on the odometer after a previous oil change performed at a time that the timer was reset. That is, control logic 90 and 92 provide periodic maintenance monitoring as opposed to real-time monitoring.

It is to be appreciated that in accordance with the present invention, display monitor 44 is optional, and receives information by reading the data link interface 78. In addition, maintenance alert systems of the present invention are preferably implemented so as to be supported by controller diagnostics (interface 50, FIG. 1) so that the maintenance alert system may optionally drive the check engine light and stop engine light instead of the monitor. Still further, if desired, device 48 (FIG. 1) may be configured to display information as an alternative or in addition to display monitor 44. Still further, device 44 may be configured with an additional indicator for alerting an operator of engine protection faults normally associated with any existing controller diagnostics.

Figure 3:
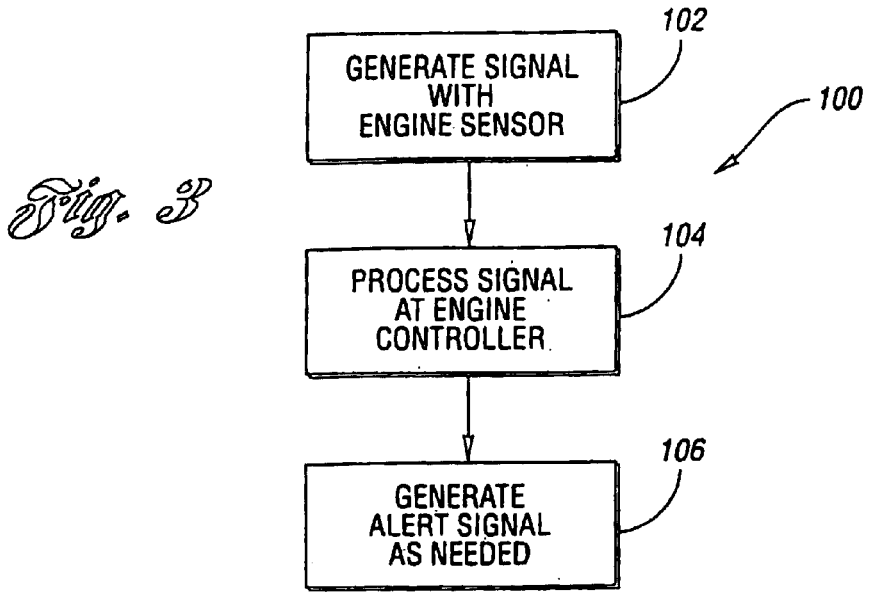
FIG. 3 is a block diagram illustrating a real-time maintenance alert method of the present invention.

With reference FIG. 3, a real-time maintenance alert method for use in a heavy-duty truck having an engine including an engine controller with memory is generally indicated at 100. In accordance with the method, a signal is generated with an engine sensor at block 102. The signal indicates at least one engine condition from the group consisting of an oil filter restriction condition, a fuel filter restriction condition, an air filter restriction condition, an oil level, and a coolant level in a coolant reserve tank. As described above, the oil filter restriction condition is preferably determined by measuring differential pressure, while the fuel and air filter restriction conditions are preferably determined by measuring inlet depression. Still further, the oil level is preferably determined with a sensor that provides valid output when the engine has stopped, and when the engine has not been running for a predetermined amount of time. Further, the fault coolant level sensor utilizes maintenance control logic that is separate from any existing engine protection or shutdown control logic, but preferably is implemented so as to co-exist with a primary (shutdown) coolant level sensor such that the fault coolant level sensor of the present invention provides an early warning of potentially dangerously low coolant conditions in the near future. At block 104, the signal or signals from the sensor output or outputs are processed at the engine controller. Control logic at the engine controller processes the sensor signal to determine a real-time fault condition when the engine condition falls outside of the predetermined acceptable range. For example, the acceptable range may be determined by a [signal] *single* threshold value, or a plurality of threshold values with the appropriate threshold value being determined based on other engine conditions, such as engine rpm (for example, control block 72, FIG. 2). At block 106, an alert signal is generated as needed on the display monitor, or optionally with the check engine and stop engine lights depending on the implementation of the present invention.

Is to be appreciated that embodiments of the present invention are particularly useful because maintenance reduction is becoming significantly more important in the trucking industry. Maintenance alert systems of the present invention provide an easy to use information center connected to the engine that can be used to display the current "go/no go" status of the normal service items of a truck at a glance rather than requiring the operator/mechanic to open the hood and physically check each item. Preferably, the maintenance alert system is mounted in an interior location easily accessible from outside the truck for mechanics and other service personnel to view.

Figure 4:
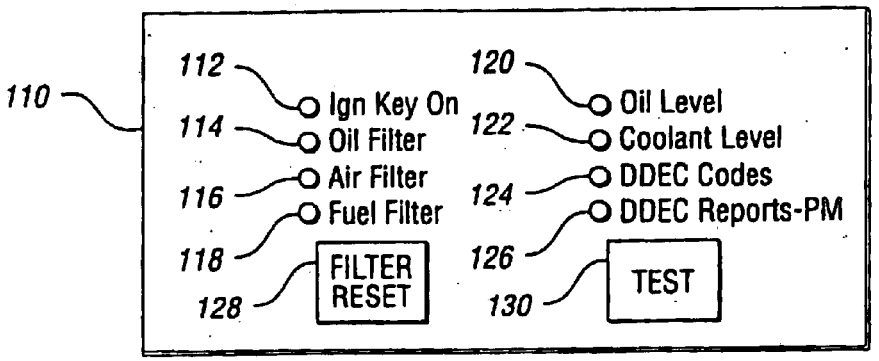
FIG. 4 is a display device of the present invention for use in a real-time maintenance alert system.

With reference to FIG. 4, a preferred embodiment for the display device is illustrated. Of course, it is to be appreciated that display 110 may take a variety of different forms, and the following description is of a preferred implementation thereof. As shown, display device 110 has eight indicators that are preferably bicolor light emitting diodes (LEDs) and two switches (filter reset and test). As shown, indicator 112 is illuminated when the ECM is asleep (recommending the key be turned on), indicator 114 indicates the condition of the oil filter, indicator 116 indicates the condition of the air filter, indicator 118 indicates the condition of the fuel filter, indicator 120 indicates the condition of the oil level, indicator 122 indicates the condition of the coolant level, indicator 124 indicates the presence of any engine controller engine protection fault codes that may be read at the diagnostics interface, indicator 126 indicates the presence of any periodic (mileage or time based) maintenance events. Further, a reset switch 128 is provided to reset display memory of filters and reread each sensor, and a test switch 130 is provided to test the functioning of the lights and display current data. In a preferred construction, display device 110 is approximately three inches high, five inches wide, and two inches deep.

Figure 5:
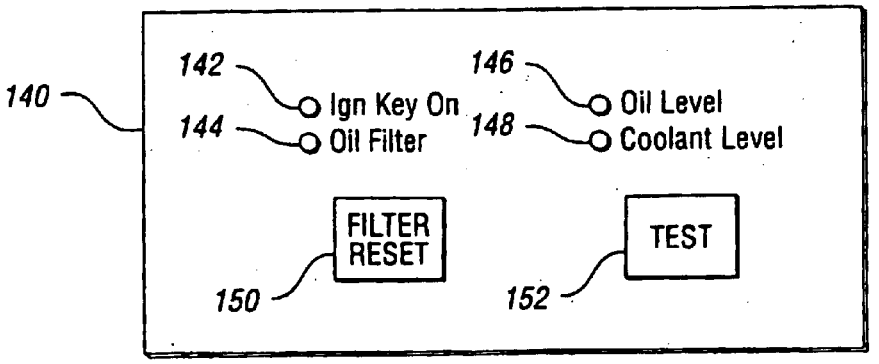
FIG. 5 is an alternative display device of the present invention for use with a real-time maintenance alert system.

With reference to FIG. 5, an alternative display 140 is shown. In the alternative, several of the indicators may be omitted, while providing a selected one or more of the indicators and the appropriate corresponding sensors. In the alternative embodiment, an ignition key "on" indicator 142, an oil filter condition indicator 144, an oil level condition indicator 146, and a coolant level condition indicator 148 are provided. Further, preferably, a reset switch 150 and a test switch 152 are provided.

Although the present invention has been described in sufficient detail above, the description found hereinafter is provided to explain in great detail, a suitable implementation of the maintenance alert system using the preferred DDEC controller, of source, it is to be appreciated that the suitable implementation description that follows is exemplary only and is not intended to limit the broad scope and spirit of the invention.

In a preferred embodiment, the display device has both read and transmit capabilities to access diagnostic codes about the normal service items from the truck's data link preferably adhering to SAE J1708 for hardware and SAE J1587 for the communications protocol. In addition to the normal service items, preferred embodiments of the display device also look for extra service indicators (ECM fault codes and periodic maintenance reports). The codes read from the data link are processed and stored within the display device to be displayed on an indicator panel display. The display preferably has each monitored item name printed on the display panel with a bicolored indicator next to the name. The indicator, preferably an LED, is red if the monitored item needs service, and is green if the item is acceptable and does not need servicing, and is off if the particular sensor is not configured.

Preferably, the display can request a unique message a short time after key on which will determine which of the lights and associated hardware on the display will be used. Thereafter, the display listens passively for a specific fault code associated with the maintenance monitor sensors via the data bus. As the specific fault codes are received, the stored go/no go status for each parameter is updated for later display. When the ignition is not on, but the engine controller is still awake, the engine controller will not be continuously broadcasting data, but will accept and respond to requests. Just before the engine controller is powered down, it will again broadcast the fluid levels, faults, and PM data. After the engine controller has powered down, it will not respond to requests.

The display unit test button, preferably a momentary contact switch, initiates a test sequence. Once the test sequence is initiated, the display will perform a bulb check by turning on all of the indicators to green for approximately one second, then to red for approximately one second. The display will then request the current periodic maintenance data, then the current information from memory will be used to turn the indicators to their appropriate color for the data. When a test sequence is initiated with the ignition on, the display has been passively listening and will have current data in memory for the sensors, but will still need updated periodic maintenance information. When the ignition is not on, but the engine controller is still active, a request must be sent to the engine controller for the fluid level as well as the periodic maintenance data to update the memory before displaying. When the ignition is not on and the engine controller is not active, the data stored in memory will be used for display.

The display unit also preferably has reset capabilities via a reset button (preferably a momentary contact switch) to be used after service has been performed to any of the filter items being monitored. The reset clears the display memory of retrieved codes for the configured filter items, thus changing the red indicators to green until new data is received and stored. Pressing and holding the reset button for three seconds or longer preferably initiates the reset sequence. The indicators will then light with the appropriate color, based on the new information as it is received.

In a preferred embodiment, the display device also performs minor diagnostics to inform the operator if the connection to the data link has been broken. This will be known if the ignition input is energized but no bus activity is seen within two seconds. When this condition occurs, the display device will flash all indicators red at roughly 2 Hz while the ignition is on until the reset button is pushed, at which time the display will go blank. If the display device is energized via the test button before the link connection has been repaired, the indicators will again flash red in place of the normal service items status until the ten seconds no activity timer has expired. After the display sees data bus activity, it will avert back to normal operation with the currently stored data and normal updates.

The messaging used preferably meets SAE J1587 communications protocol. Knowing this determines the following PART IDENTIFICATIONS (PID):

| Data | PID |
|---|---|
| Air Filter Restriction | 107 |
| Coolant level | 111 |
| Fuel Filter Restriction | 95 |
| Oil Filter Restriction | 99 |
| Oil Level | 98 |
| Fault Codes | 194/192 |
| ECM Sensor configuration | ID #66 |
| ECM Reports Data | ID #67 |

The configuration message preferably is an ECM unique message that is one byte in length. This message provides the information stating which sensors of the Maintenance monitor system are configured in the ECM. The message must be requested from the ECM shortly after the ignition has been turned on (approx. 10 seconds) and additionally can be requested at any other time. The oil level is the only sensor this message is mandatory for, but the other four sensors will be included in the message as well. The message number and format will be:

ECM Unique ID 66

Bits 8–6: Set to 0

Bit 5: Air Filter Restriction Configured
1=Configured

Bit 4: $2^{nd}$ Coolant Level Sensor Configured
1=Configured

Bit 3: Fuel Filter Restriction Sensor Configured
1=Configured

Bit 2: Oil Filter Restriction Sensor Configured
1=Configured

Bit 1: Oil Level Sensor Configured
1=Configured

To request an ECM Unique ID, send the following message:

X 254 128 0 Y [0 Q]

where:

X is the MID of the requestor,

Y is an ECM Unique ID desired,

Q is another ECM Unique ID if desired,

If ECM Unique ID 66 and 67 was requested, the response would look like:

128 254 Z 66 V 67 W where:

Z is either the MID of the requester or the MID of the last device on the system to make an ECM Unique ID request, and V and W are additional data.

Normal Operation

Once the maintenance alert system is in the normal operating mode (passive listening), the system monitors fault codes from both the engine ECM and the maintenance sensors. Each fault code received about the maintenance sensors will only effect the status of one LED. The LEDs for the levels and the filters will only turn red for service if the fluid is low or the filter restriction is high.

In one suitable indicator configuration using LEDs, the LED functioning is as follows:

LED 1, "Ign Key On"

The function of this light is to inform the operator when the display is showing memory data rather than current data. This LED will use the +5V sensor supply input wire. The LED will be:

RED—Sensor supply voltage input grounded Memory Data).

OFF—Sensor supply voltage input at +5V (Current Data).

LED 2, "Oil Level"

The oil level LED will be:

RED—Oil Level PID 98 FMI 1 only (Engine Oil Level Low).

GREEN—Oil Level PID 98 received without fault codes for PID 98.

YELLOW (drive both red and green)—Oil Level PID 98 not received even though configured.

OFF—Oil level not configured OR fault codes for PID 98 other than FMI [0] *1*.

LED 3, "Oil Filter"

The oil filter LED will be:

RED—Oil filter restriction PID 99 FMI 0 only (Primary Oil Filter Restriction High).

GREEN—Oil filter restriction PID 99 received without fault codes for PID 99.

OFF—Oil filter restriction not configured OR fault codes for PID 99 other than FMI 0.

LED 4, "Coolant Level"

The coolant level LED will be:

RED—Coolant level PID 111 FMI 1 only (Coolant level low).

GREEN—Coolant level PID 111 received without fault codes for PID 111.

OFF—Coolant level not configured OR fault codes for PID 111 other than FMI 1.

LED 5, "Air Filter"

The air filter restriction LED will be:

RED—Air filter restriction PID 107 FMI 0 only (Air Filter Restriction High).

GREEN—Air filter restriction PID 107 received without fault codes for PID 107.

OF—Air filter restriction not configured OR fault codes for PID 107 other than FMI 0.

LED 6, "DDEC Codes" (Protection Faults)

The ECM codes LED is intended to assist service personnel by indicating the presence of fault codes in the ECM.

The ECM Codes LED will be:

RED—The presence of any active fault code from MID 128.

Yellow—The presence of only inactive fault codes from MID 128.

GREEN—No fault codes from MID 128.

LED 7, "Fuel Filter"

The fuel filter restriction LED will be:

RED—Fuel filter restriction PID 95 FMI 0 only (Primary Fuel Filter Restriction High).

GREEN—Fuel filter restriction PID 95 received without fault codes for PID 95.

OFF—Fuel filter restriction not configured OR fault codes for PID 95 other than FMI 0.

LED 8, "DDEC Reports—PM" (Periodic Maintenance)

The Data Pages portion of the ECM has three preventative maintenance reminders normally to be accessed through the DDEC Reports Software package. An ECM unique message will be used and can be requested to show the configuration/status of the PM reminders. This message will be one byte in length with the capability of showing the status of four PM reminders (possibly future ECM expansion) and needs to be requested at each test sequence, but use the data from memory if the ECM is not powered.

The message identifier and format will be:

ECM Unique ID 67

Bits 8, 7: Not Defined—Set to 11 (Not Configured)

Bits 6, 5: PM C
- 00-Configured, No Service Needed
- 01-Configured, Service Needed
- 11-Not Configured Bits 4, 3: PM B
- 00-Configured, No Service Needed
- 01-Configured, Service Needed
- 11-Not Configured Bits 2, 1: PM A
- 00-Configured, No Service Needed
- 01-Configured, Service Needed
- 11-Not Configured The DDEC Reports LED will be:

RED—Any one or more of the PM reminders is configured and needs service.

GREEN—None of the configured PM reminders need service.

OFF—None of the PM reminders are configured.

Preferably, the display unit is mounted inside the truck cab on the floor beside the driver's seat for easy viewing and access while standing outside the truck with the driver's door open. The case of the display should then have easy mounting to the floor either directly or via a suitable bracket thus making for easy viewing conditions while standing just outside the door. This mounting location also necessitates that the case be made of a reasonably sturdy material to prevent damage if bumped with a hammer, fire extinguisher, etc. The display should be sealed for the occasional cleaning of the cab via water hose and a have a −40 to 85 degree Celsius temperature range. The products used preferably also are built to withstand the normal cleaning fluids and other materials found inside a truck just as the main instrument panel must.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A real-time maintenance alert system for use in a heavy duty truck having an engine including an air filter at an air inlet, and an engine controller having a communications data link and, the system comprising:

a sensor operative to produce a signal indicative of an air inlet depression;

control logic at the engine controller, the control logic being [conjured] *configured* to process the sensor signal and to determine an air filter restriction real-time fault condition when the air inlet depression falls below a threshold, the control logic being operative to produce an output signal at the data link in response to the air filter restriction real-time fault condition; and a display device having a memory and configured to transmit and receive information over the data link, the display processing the output signal and storing a status of the air filter in the memory, and generating an output signal indicative of the status.

2. The system of claim 1 wherein the threshold is a function of an engine rpm.

3. The system of claim 2 wherein the threshold is a first value when the engine rpm is less than a predetermined value and, otherwise, the threshold is a second value.

4. The system of claim 1 wherein the air filter restriction real-time fault condition is determined in response to the air inlet depression falling below the threshold more than one time during a predetermined time interval.

5. A real-time maintenance alert system for use in a heavy duty truck having an engine including a fuel filter at a fuel inlet, and an engine controller having a communications data link and, the system comprising:

a sensor operative to produce a signal indicative of a fuel inlet depression;

control logic at the engine controller, the control logic being configured to process the sensor signal and to determine a fuel filter restriction real-time fault condition when the fuel inlet depression falls below a threshold, the control logic being operative to produce an output signal at the data link in response to the fuel filter restriction real-time fault condition; and a display device having a memory and configured to transmit and receive information over the data link, the display device processing the output signal and storing a status of the fuel filter in the memory, and generating an output signal indicative of the status.

6. A real-time maintenance alert system for use in a heavy duty truck having an engine including an oil filter having an inlet and an outlet, and an engine controller having a communications data link and, the system comprising:

a sensor operative to produce a signal indicative of an oil filter pressure differential between the oil filter inlet and the oil filter outlet;

control logic at the engine controller, the control logic being configured to process the sensor signal and to determine an oil filter restriction real-time fault condition when the oil filter pressure differential exceeds a threshold, the control logic being operative to produce an output signal at the data link in response to the oil filter restriction real-time fault condition; and a display device having a memory and configured to transmit and receive information over the data link, the display device processing the output signal and storing a status of the oil filter in the memory, and generating an output signal indicative of the status.

7. A real-time maintenance alert system for use in a heavy duty truck having an engine including an oil pan, and an engine controller having a communications data link and, the system comprising:

a sensor operative to produce a signal indicative of an oil level;

control logic at the engine controller, the control logic being configured to process the sensor signal and to determine a low oil real-time fault condition when the oil level falls below a threshold, the control logic being operative to produce an output signal at the data link in response to the oil level real-time fault condition; and a display device having a memory and configured to transmit and receive information over the data link, the display device processing the output signal and storing a status of the oil level in the memory, and generating an output signal indicative of the status.

8. The system of claim 7 wherein the low oil real-time fault condition is determined in response to the oil level falling below the threshold while the engine is not running.

9. The system of claim 8 wherein the low oil real-time fault condition is determined in response to the oil level being below the threshold while the engine is not running and has not been running for a predetermined time interval.

10. A real-time maintenance alert system for use in a heavy duty truck having an engine including a coolant reserve tank, and an engine controller having a communications data link and, the system comprising:

a sensor operative to produce a signal indicative of a coolant level;

control logic at the engine controller, the control logic being configured to process the sensor signal and to determine a low coolant real-time fault condition when the coolant level falls below a threshold, the control logic being operative to produce an output signal at the data link in response to the low coolant real-time fault condition, wherein the threshold is sufficiently high such that engine shutdown is not required upon the presence of the low coolant real-time fault condition; and a display device having a memory and configured to transmit and receive information over the data link, the display device processing the output signal and storing a status of the coolant reserve tank in the memory, and generating an output signal indicative of the status.

11. The system of claim 10 further comprising:

a primary coolant level sensor operative to produce a signal indicative of a sufficiently low coolant level to demand engine shutdown, wherein the control logic is further configured to determine an engine shutdown fault upon the presence of the primary coolant level sensor signal.

12. A real-time maintenance alert system for use in a heavy duty truck having an engine, and an engine controller having a communications data link, the system comprising:

a sensor operative to produce a signal indicative of at least one engine condition from the group consisting of: an oil filter restriction condition, a fuel filter restriction condition, an air filter restriction condition, an oil level, and a coolant level in a coolant reserve tank;

control logic at the engine controller, the control logic being configured to process the sensor signal and to determine a real-time fault condition when the engine condition falls outside of a predetermined acceptable range, the control logic being operative to produce an output signal at the data link in response to the real-time fault condition; and a display device having memory and configured to transmit and receive information over the data link, the display device processing the output signal and storing a fault condition status in the memory, the display device having an indicator operative to alert a user of the real-time fault condition.

13. A real-time maintenance alert method for use in a heavy duty truck having an engine, and an engine controller having a communications data link and, the method comprising:

generating a signal with an engine sensor, the signal being indicative of at least one engine condition from the group consisting of: an oil filter restriction condition, a fuel filter restriction condition, an air filter restriction condition, an oil level, and a coolant level in a coolant reserve tank;

processing the signal with control logic at the engine controller to determine a real-time fault condition when the engine condition falls outside of a predetermined acceptable range, the control logic being operative to produce an output signal at the data link in response to the real-time fault condition;

receiving the output signal over the data link at a display device having a memory; and storing a fault condition status in the memory.

14. The method of claim 13 further comprising:

generating an alert signal on the display device to alert a user of the real-time fault condition.

15. A display device for use with a real-time maintenance alert system for a heavy duty truck having an engine and an engine controller having a communications data link, the display device comprising:

a housing;

an interface configured to communicate with control logic at the engine controller over the data link, the control logic being configured to process a sensor signal indicative of an engine condition from the group consisting of: an oil filter restriction condition, a fuel filter restriction condition, an air filter restriction condition, an oil level, and a coolant level in a coolant reserve tank, and the control logic being further configured to determine a real-time fault condition when the engine condition falls outside of a predetermined acceptable range, the control logic being operative to produce an output signal at the data link in response to the real-time fault condition, the interface receiving the output signal;

a memory for storing a fault condition status based on the output signal; and an indicator device affixed to the housing and in communication with the interface, the indicator device producing a visual indication when the output signal corresponding to the real-time fault condition is received at the interface.

16. The display device of claim 15 wherein the control logic is further configured with engine protection shutdown logic operative to provide an engine protection fault condition signal to the interface, the display device further comprising:

an engine protection indicator device affixed to the housing and in communication with the interface, the engine protection indicator device producing a visual indication when the output signal corresponding to the engine protection fault condition is received at the interface.

17. The display device of claim 15 wherein the control logic is further configured with periodic maintenance logic operative to provide a periodic maintenance fault condition signal to the interface, the display device further comprising:

a periodic maintenance indicator device affixed to the housing and in communication with the interface, the periodic maintenance indicator device producing a visual indication when the output signal corresponding to the periodic maintenance fault condition is received at the interface.

18. The display device of claim 15 further comprising:

a reset switch in communication with the interface, wherein the interface and the control logic are configured such that assertion of the reset switch causes a refreshing of the sensor signal.

19. The display device of claim 15 further comprising:

a test switch in communication with the indicator device, wherein the indicator device is configured to produce the visual indication for a predetermined period of time in response to assertion of the test switch.

20. The display device of claim 15 wherein the indicator device comprises:

a light emitting diode.

* * * * *

UNITED STATES PATENT AND TRADEMARK OFFICE

CERTIFICATE OF CORRECTION

PATENT NO. : RE 39,845 E
APPLICATION NO. : 10/167028
DATED : September 18, 2007
INVENTOR(S) : David Lawrence Hasfjord et al.

It is certified that error appears in the above-identified patent and that said Letters Patent is hereby corrected as shown below:

Column 12, Line 18, Claim 1:

After "display" insert -- device --.

Signed and Sealed this

Twenty-fifth Day of December, 2007

JON W. DUDAS
*Director of the United States Patent and Trademark Office*